US008221110B2

(12) United States Patent
Lichy

(10) Patent No.: US 8,221,110 B2
(45) Date of Patent: Jul. 17, 2012

(54) DEVICE FOR EXPANDING A TUBULAR ELASTIC BODY

(75) Inventor: Radim Lichy, Alingsås (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 12/708,032

(22) Filed: Feb. 18, 2010

(65) Prior Publication Data
US 2010/0151071 A1    Jun. 17, 2010

Related U.S. Application Data

(63) Continuation of application No. PCT/SE2008/050938, filed on Aug. 20, 2008.

(30) Foreign Application Priority Data

Aug. 28, 2007   (SE) ...................................... 0701941

(51) Int. Cl.
*B29C 57/04* (2006.01)
(52) U.S. Cl. ....... 425/393; 425/466; 425/467; 425/DIG. 218; 72/393; 29/871
(58) Field of Classification Search ................... 425/392, 425/393, 466–468, DIG. 218; 72/392–393; 29/868, 869, 871–872
See application file for complete search history.

(56) References Cited

U.S. PATENT DOCUMENTS

| 3,484,900 A * | 12/1969 | Broome et al. ............... 425/393 |
| 3,888,102 A * | 6/1975 | Nigido ............................ 72/393 |
| 4,412,802 A * | 11/1983 | Ohta et al. .................... 425/393 |
| 5,419,030 A | 5/1995 | Szymberski |
| 5,987,745 A * | 11/1999 | Hoglund et al. ................ 29/869 |
| 6,782,618 B2 * | 8/2004 | Luzzi ............................. 29/868 |
| 7,128,560 B2 * | 10/2006 | Tandart ........................ 425/392 |

FOREIGN PATENT DOCUMENTS

| DE | 3001158 A1 | 7/1980 |
| DE | 19826123 A1 | 8/1999 |
| EP | 0707749 B1 | 8/1998 |
| WO | 9429938 A1 | 12/1994 |
| WO | 0207280 A1 | 1/2002 |

OTHER PUBLICATIONS

International Search Report; PCT/SE2008/050938; Dec. 9, 2008; 3 pages.
European Search Report; Application No. EP 08 79 4163; Jun. 23, 2011; 4 pages.

* cited by examiner

*Primary Examiner* — Richard Crispino
*Assistant Examiner* — Thukhanh Nguyen
(74) *Attorney, Agent, or Firm* — St. Onge Steward Johnston & Reens LLC

(57) ABSTRACT

A device for expanding a tubular elastic body, the device comprises a rigid tube to be introduced into at least a part of the elastic body and keep the elastic body in an expanded state, and an expansion means adapted to expand the elastic body and arranged to be introduced into a first end of the rigid tube. The expansion means is adapted to be movable inside the rigid tube and when the expansion means is fully introduced in the rigid tube, the expansion means protrudes at a second end of the rigid tube and thereby forms a transition between the rigid tube and the expansion element. One end of the expansion means is provided with a radially resilient expansion element with a width decreasing in the introduction direction of the expansion means into the first end of the rigid tube.

15 Claims, 4 Drawing Sheets

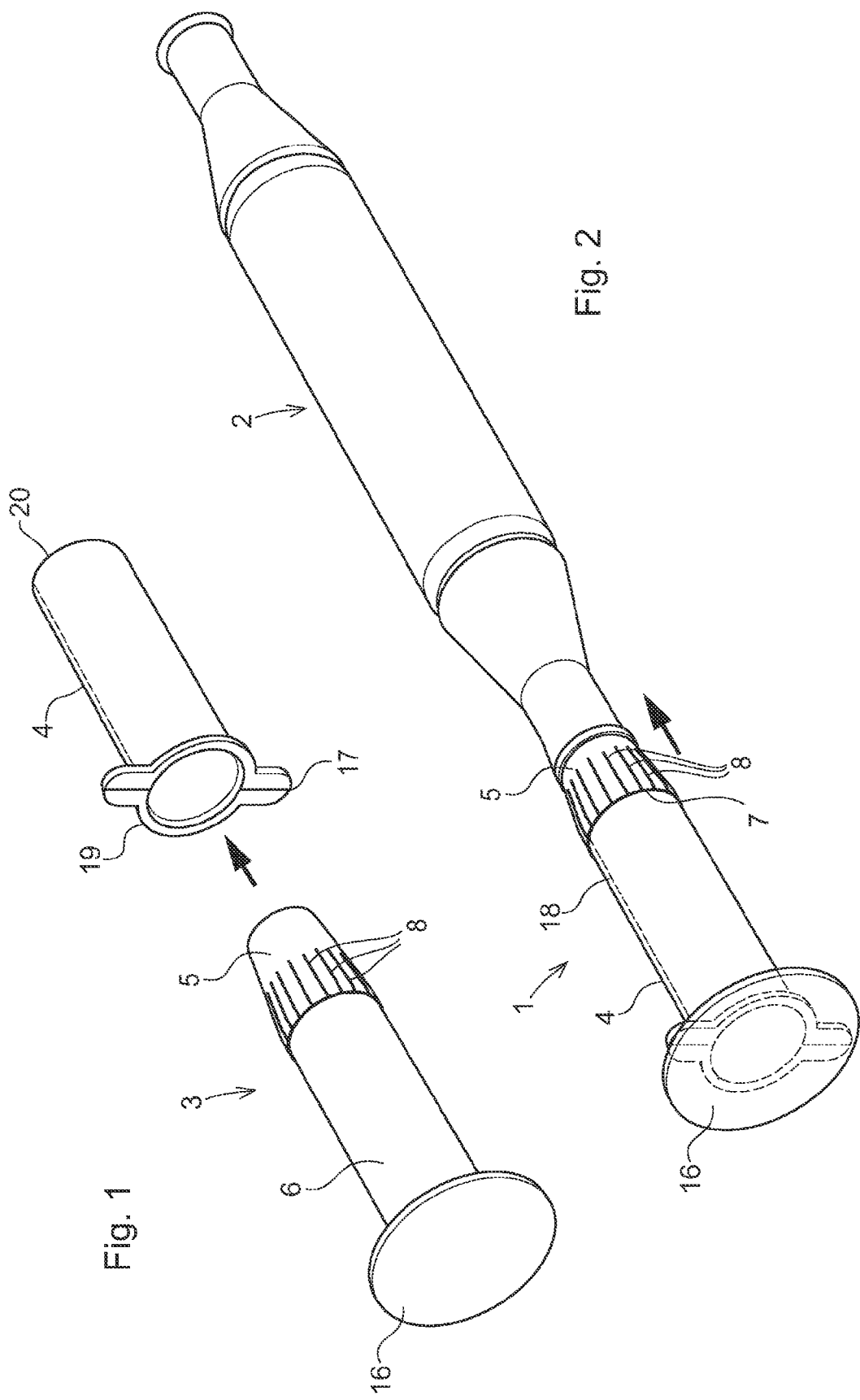

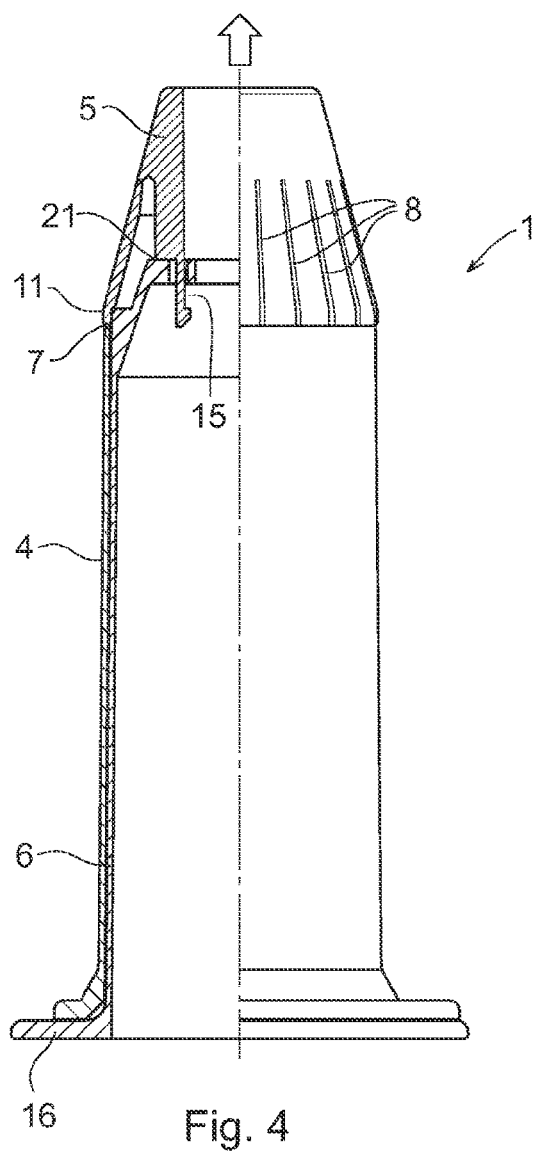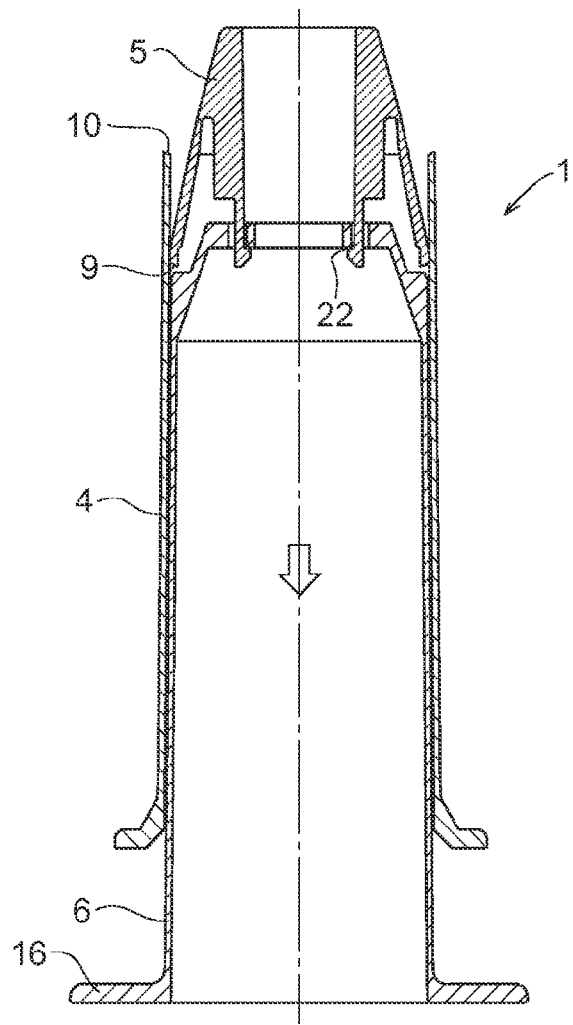
Fig. 4
Fig. 5

DEVICE FOR EXPANDING A TUBULAR ELASTIC BODY

CROSS-REFERENCE TO RELATED APPLICATIONS

The present application is a continuation of pending International patent application PCT/SE2008/050938 filed on Aug. 20, 2008, which designates the United States and claims priority from Swedish patent application number 0701941-7 filed on Aug. 28, 2007, the content of which is incorporated herein by reference.

FIELD OF THE INVENTION

The present invention relates to a device for expanding a tubular elastic body for a medium- or high-voltage power cable.

BACKGROUND OF THE INVENTION

In this description, medium-voltage cables refer to cables that are used in the voltage range of 12-36 kV, and high-voltage cables refer to cables that are used in the voltage range exceeding 36 kV.

When jointing a cable, the conductors from two cable ends are joined together with a jointing sleeve after the respective conductor has first been exposed from the surrounding insulation. The jointing sleeve brings the sleeve into contact with the conductor by means of mechanical deformation. The joint with the jointing sleeve must then be insulated. This insulation is usually carried out with a prefabricated tubular elastic body of rubber, hereinafter called jointing body. Known jointing bodies are usually formed with a substantially cylinder-shaped shell. The actual jointing body is provided with a continuous cylindrical hole, where the hole in the natural, non-stretched, state has an inner diameter that is somewhat smaller than the outer diameter of the insulation on the cable to be jointed. This is necessary for the elastic jointing body to embrace the insulation of the cable ends for the purpose of obtaining a closefitting joint.

When jointing is to be carried out, the work is initiated by placing the jointing body in a position over one of the cable ends, i.e. before the jointing sleeve has joined the conductors together. Moving a jointing body over a cable without first stretching the jointing body is difficult and allows the jointing body to be used only on a cable with a well-defined outer diameter that is adapted to the size of the jointing body. It is especially difficult for jointing bodies designed for medium- or high-voltage cables as those jointing bodies has a larger amount of elastic material that has to be stretched out. It is therefore common for the jointing body to be stretched onto the tube before the jointing body is brought into place. The jointing body is brought into place by first placing it over one of the cable ends, and after jointing the conductors the body is arranged over the joint.

It is known to stretch the jointing body onto a thin tube of, for example, a polymer at the factory making jointing bodies. The jointing body with the tube then has an inner diameter that is larger than both the outer diameter of the cable being jointed and a possible jointing sleeve in the joint. Therewith the jointing body may be easily fitted onto the cable according to the above description. A drawback of this arrangement is that the jointing body will be expanded for a long time and there is a risk that the rubber settles and possibly loses its re-sealing power, or that the storage time of the jointing body becomes limited.

A known way to avoid this is to stretch the jointing body onto a tube in connection with the jointing to be carried out. EP 0 707 749 B1 discloses a mounting tool for expanding a jointing body on a rigid tube before the jointing body is applied over the joint. The jointing body comprises a first end part and a second end part. The mounting tool comprises a rigid tube and an expansion cone insertable therein. When the expansion cone is fully inserted into the rigid tube, the expansion cone is arranged with is widest part at one end of the rigid tube. The expansion cone and rigid tube is inserted into the jointing body by firstly inserting the end with the cone into the first end portion of the jointing body, whereby the first end portion is expanded onto the rigid tube. The rigid tube has a larger inner diameter than the cable, and allows the expanded jointing body to be easily fitted over the cable after withdrawal of the expansion cone from the rigid tube. The expansion cone is provided with a handle extending through the rigid tube. The same procedure is used for the second end portion of the jointing body, which is expanded in the same way allowing the entire jointing body to be easily fitted over one of the cable ends. A drawback with this known tool is that it is difficult to remove the expansion cone through the rigid tube after the jointing body has been expanded on the rigid tube. Also, the edge of the rigid tube at the connection to the largest diameter of the expansion cone has to be very sharp to form an even, smooth transition towards the expansion cone. This sharp edge may damage the inside of the jointing body when the mounting tool is pushed into the jointing body.

There is therefore a need for an expansion device which overcomes the above drawbacks.

In the above description a jointing body has been described as an example of an elastic tubular body. Other examples of elastic tubular body for high-voltage or medium-voltage cables are a stress cone, a termination, a shielding or sealing sleeve or an adapter. Elastically expandable adapters are used to adapt a cable joint or a stress cone, with an inner diameter adapted to a certain cable diameter, to a cable with a smaller cable diameter. By using adapters, a cable joint or a stress cone may be used for a plurality of different cable diameters. A stress cone is used in a cable joint or a cable termination.

SUMMARY OF THE INVENTION

The object of the invention is to provide a device for expanding a tubular elastic body for a medium- or high-voltage power cable. The device should be easy to handle and facilitate expanding the elastically expandable body.

This object is obtained by a device for expanding a tubular elastic body having the features of claim 1. Advantageous embodiments of the invention will be clear from the description below and from the dependent claims.

According to one embodiment the device comprises a rigid tube adapted to be introduced into at least a part of the elastic body and to keep the elastic body in an expanded state. The device also comprises an expansion means adapted to expand the elastic body and arranged to be introduced into a first end of the rigid tube. One end of the expansion means is provided with an expansion element with a width decreasing in the introduction direction of the expansion means at introduction in the first end of the rigid tube. The expansion means is adapted to be movable inside the rigid tube and when the expansion means is fully introduced in the rigid tube the expansion means protrudes at a second end of the rigid tube and thereby forms a transition between the rigid tube and the expansion element. The expansion element is radially resilient between a first and second state over at least part of the expansion elements length in axial direction, and the outer diameter of the expansion element at the transition is essentially the same as, or larger than, the outer diameter of the rigid tube at the transition when the expansion means is in the first state. Further, the outer diameter of the expansion element is smaller than the inner diameter of the rigid tube when the expansion means is in the second state. The device is arranged such that the expansion element is in the first state when the expansion means is fully introduced into the rigid tube and that the expansion element is in the second state when the expansion means is adapted to be movable in the rigid tube. By having a radially resilient expansion element it is possible for the expansion element to have a larger diameter than the outer diameter of the rigid tube during introduction of the expansion means into one end of the elastic body. Thereby the introduction of the rigid tube into the elastic body is facilitated. Also the risk that the inside of the elastic body is damaged by the rigid tube is minimized. One further advantage is that the rigid tube can be made thicker than the rigid tube of the mounting tool in the above described prior art. A thicker rigid tube is more resistant to cracking and the transition between the rigid tube and the expansion element is smoother.

According to one embodiment the expansion element is at least partly conical thereby facilitating the introduction of the expansion means into the elastic body.

According to one embodiment the expansion means comprises a handle to which the expansion element is aligned in an axial direction and attached to in a loose connection. The handle is adapted to cooperate with the expansion element during introduction and withdrawal of the expansion means through the rigid tube.

According to one embodiment the handle has the shape of a tube with an outer diameter being close to the inner diameter of the rigid tube. Therewith the rigid tube is supported by the handle during introduction of the expansion means and the rigid tube into the elastic body.

According to one embodiment the expansion means has a play in axial direction at the loose connection between the expansion element and the handle facilitating moving the expansion means from the first state to the second state, and the loose connection comprises a first and a second contact surface.

According to one embodiment the handle comprises a support adapted to be in contact with the first end of the rigid tube during introduction of the expansion means and rigid tube into the elastic body.

According to one embodiment the expansion element is slit with a plurality of slits from the end facing the transition such that the expansion element is radially resilient. The slits are arranged such that the largest diameter of the expansion element can be reduced by radially compressing the expansion means from the outside by the elastic body and by withdrawing the expansion means through the rigid tube. The slits also facilitate the transport of lubricant between the inner diameter of the elastic body and the outside of the expansion means and rigid tube such that the introduction of the expansion means and the rigid tube into the tubular elastic body is facilitated.

According to one embodiment of the invention the expansion element has a through bore and the material at the slits defines an at least partly conical envelope surface. Therewith the amount of material necessary for manufacturing the expansion element is reduced compared to prior art devices. The number of slits, their width and length is adapted to the size of the device such that at least part of the expansion element is radially resilient. The size of the device depends on the inner diameter of the elastic body to be expanded.

According to one embodiment of the invention the expansion element is arranged to be axially supported by the handle at the first contact surface in the first state, such that at least part of the force necessary for introducing the device into the elastic body is transferred between the handle and the expansion element through the first contact surface.

According to one embodiment of the invention the expansion element is arranged to be axially supported by the handle at the second contact surface, such that at least part of the pulling force necessary for removing the expansion means out of the elastic body and rigid tube is transferred between the handle and expansion element through the second contact surface.

According to one embodiment the end of the expansion element facing the transition has a first bevel cut edge with an angle corresponding to an angle of a second bevel cut edge at the front end of the expansion means. Thereby the expansion means can be supported by the rigid tube through the second beveled cut edge when the device is inserted into the elastically expandable body.

According to one embodiment the end of the expansion element facing the transition comprises a rounded edge, such that a smooth transition is formed between the first beveled cut edge and the outer surface of the expansion element. The rounded edge facilitates removing the expansion means through the expansion tube.

According to one embodiment the rigid tube comprises at least two semi-cylindrical parts configured to be put together to the shape of the rigid tube. Thereby it is possible to remove the rigid tube from the cable in an easy way after the rigid tube has been removed from the elastic body. Also, it would be possible to re-use the rigid tube.

According to one embodiment each semi-cylindrical part comprises a first parting surface comprising at least one protrusion and a second parting surface comprising at least one corresponding recess for receiving the at least one protrusion when the at least two parts are assembled to the rigid tube. Therewith a quick way to assemble the rigid tube and to remove it from the cable after the rigid tube has been removed from the elastic body is provided.

According to an alternative embodiment to the above described embodiment the two semi-cylindrical parts are connected at one parting surface with a hinge.

According to one embodiment the device is made of a polymer, for example, polypropylene (PP) or polyamide (PA).

According to one embodiment the tubular elastic body comprises one of the following: a jointing body, a termination, a stress cone, a shielding or sealing sleeve, or an adapter.

BRIEF DESCRIPTION OF THE DRAWINGS

The invention will be described with reference to the accompanying drawings, wherein FIG. 1 schematically shows a device for expanding a tubular elastic body according to one embodiment of the invention, FIG. 2 schematically shows the device according to the embodiment in FIG. 1 when the device is introduced into a tubular elastic body, FIG. 3 schematically shows a rigid tube of the embodiment in FIG. 1 after removal of the rigid tube from the tubular elastic body forming a cable joint, FIG. 4 is the device in a first state according to one embodiment of the invention, in partly a cross-section, FIG. 5 is the device according to the embodiment shown in FIG. 4, shown in a cross-section, and FIG. 6 schematically shows an embodiment of the rigid tube of the device according to one embodiment of the invention.

DETAILED DESCRIPTION OF THE INVENTION

Figure 3:
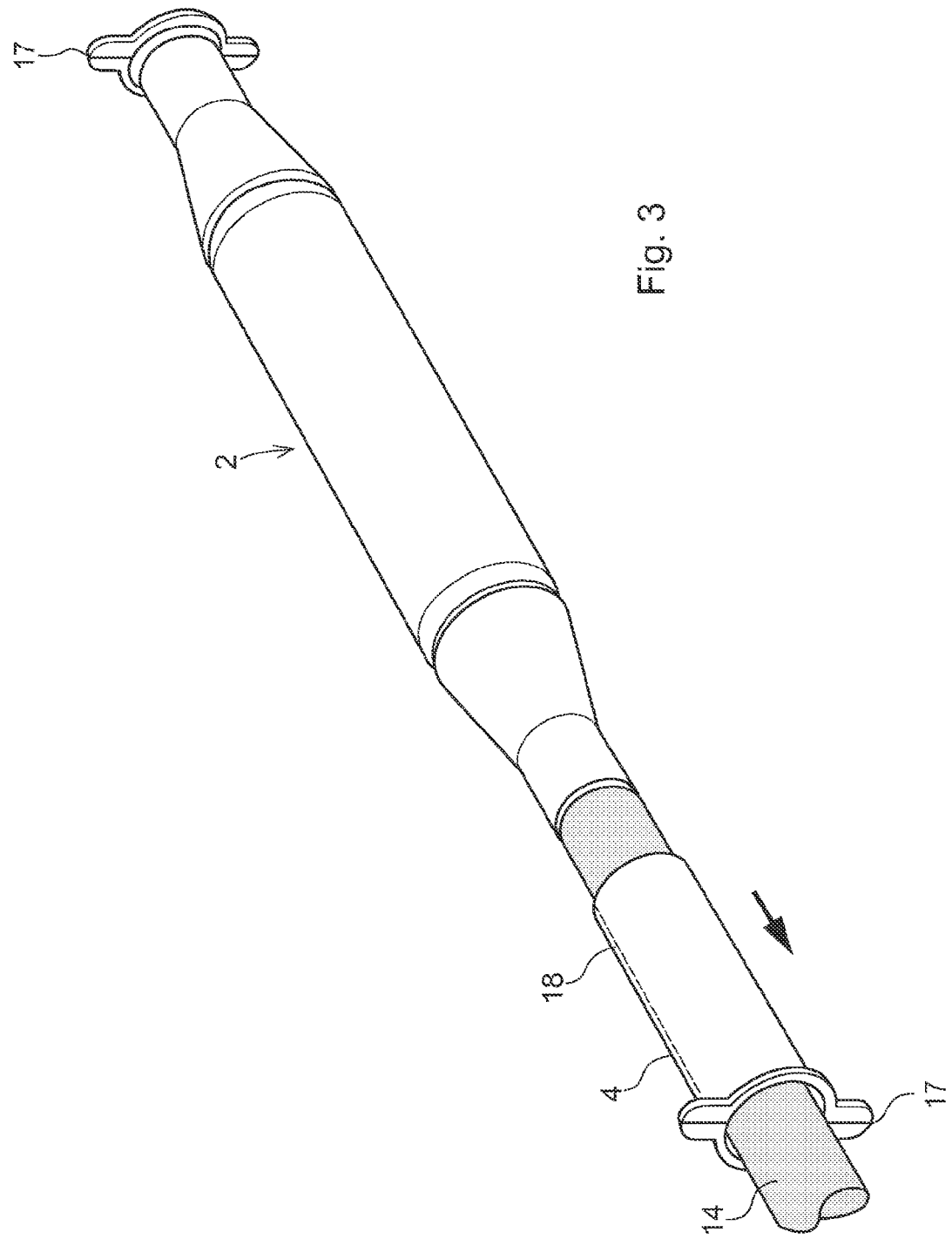

FIG. 1 schematically shows a device 1 for expanding a tubular elastic body 2 according to one embodiment of the invention. The elastic body 2 in FIG. 1 is a jointing body for a cable joint between two cables 14. The device 1 comprises a rigid tube 4 to be introduced into at least one end part of the elastic body 2 and keep the elastic body in an expanded state. An expansion means 3 is adapted to expand the elastic body 2 and is arranged to be introduced into a first end 9 of the rigid tube 4. One end of the expansion means 3 is provided with an expansion element 5 with a width decreasing in the introduction direction of the expansion means 3 at introduction into the first end 19 of the rigid tube 4. The expansion means 3 is adapted to be movable inside the rigid tube 4. The expansion element 5 comprises a plurality of slits 8 arranged from the end facing the transition 7. The number of slits, the width of the slits and the length of the slits 8 are adapted to the size of the device such that at least a part of the expansion element 8 is radially resilient between a first and second state. The device 1 is arranged such that the expansion element 5 is in the first state when the expansion means 3 is fully introduced into the rigid tube 4 and that the expansion element 5 is in the second state when the expansion means 3 is moving in the rigid tube or when at least part of the expansion element 5 is inside the rigid tube 4.

FIG. 2 shows the expansion means 3 when it is in the first state, i.e. fully introduced in the rigid tube 4. The expansion means 3 protrudes at a second end 20 of the rigid tube and forms a transition 7 between the rigid tube 4 and the expansion element 5. The outer diameter of the expansion element 5 at the transition is larger than the outer diameter of the rigid tube 4 at the transition 7.

FIG. 2 also shows the device 1 when it is introduced into one end of the tubular elastic body 2, whereby the end portion of the elastic body is expanded onto the rigid tube 4. Thereafter the expansion means 3 is withdrawn through the rigid tube 4 and the expansion means is in the second state. In the second state the outer diameter of the expansion element 5 is smaller than the inner diameter of the rigid tube 4 due to the radially resilient expansion element 5. The rigid tube 4 has a larger inside diameter than the outer diameter of the cable 14, which allows the elastic body 2 to be easily fitted over the cable after the expansion means 5 has been withdrawn from the rigid tube 4. The other end of the elastic body 2 is expanded over a second rigid tube in the same way, allowing the entire elastic body to be easily fitted over one of the cable cores 14.

When the device 1 is to be inserted into one end of the elastic body 2 the friction between the device and the inside of the elastic body needs to be reduced. This is achieved by applying a suitable lubricant on the inside of the elastic body 2 and/or on the outside of the device 1. Between the end portions of the elastic body in FIGS. 2 and 3 there is an elongated, substantially cylindrical inner space with a cross-section area larger than the cross-section area of the holes at the end portions. Thereby the enlarged inner part of the elastic body needs not to be expanded. However, it would be possible to use the device 1 on a straight cylindrical centre hole adapting the length of the device 1 to the elastic body 2 such that the complete length of the tubular elastic body is expanded.

FIG. 3 shows the elastic body in FIG. 2 after joining the conductors of the cables 14 and centering the elastic body 2 over the joint. The rigid tube 4 has been withdrawn from the respective end portions and removed which results in the end portions of the tubular elastic body 2 re-sealing around the cable 14.

FIG. 4 shows the device 1 in the first state according to one embodiment of the invention. In the first state the expansion element 5 is fully introduced in the rigid tube 4. The expansion means 3 protrudes at the second end 20 of the rigid tube and forms a transition 7 between the rigid tube 4 and the expansion element 5. The outer diameter of the expansion element 5 at the transition is larger than the outer diameter of the rigid tube 4 at the transition 7. The expansion means 3 comprises a handle 6 to which the expansion element 5 is attached in a loose connection and aligned in an axial direction 1. The handle 6 is adapted to cooperate with the expansion element 5 during introduction and withdrawal of the expansion means 3 through the rigid tube 4. The support 16 is adapted to be in contact with the first end of the rigid tube 4 during introduction of the expansion means 3 into the elastic body 2.

In FIG. 5 the device 1 is assembled to be introduced into the tubular elastic body 2 as shown in FIG. 2. At least part of the force necessary for introducing the expansion means 3 and rigid tube 4 into the tubular body is transferred between the handle 6 and expansion element through a first contact surface 21 between the handle 6 and the expansion element 5. The support 16 is preferably arranged on the ground when expanding the elastic body 2 on the device 1. The handle 6 has the shape of a tube with an outer diameter being close to the inner diameter of the rigid tube 4.

The expansion means has a play 15 in axial direction at the connection between the expansion element 5 and the handle 6 facilitating moving the expansion means 3 from the first state to the second state.

The expansion element 5 is slit with a plurality of slits 8 from the end facing the transition 7. The number of slits, the width of the slits and the length of the slits 8 are adapted to the size of the device such that at least a part of the expansion element 8 is radially resilient. For example, the expansion element in FIG. 4 is configured for a tubular elastic body with an inner diameter of 29 mm. The expansion means has a maximum diameter of 45 mm at the transition 7, and has twenty slits extending over at least half of the axial length of the expansion element 5. The width of each slit is 0.8 mm such that the diameter of expansion element 5 can be reduced when it is in the second state.

The end of the expansion element 5 facing the transition 7 has a first bevel cut edge 9 with an angle corresponding to an angle of a second bevel cut edge 10 at the front end 7 of the expansion means 3, such that when the device is inserted into the elastically expandable body 1 the expansion means 3 is supported by the expansion tube 4 through the second beveled cut edge 10. The end of the expansion element 5 facing the transition 7 comprises a rounded edge 11, such that a smooth transition 7 is formed between the first beveled cut edge 9 and the outer surface of the expansion element 5.

FIG. 5 shows the embodiment according to FIG. 4 in the second state. When the end portion of the elastic body (not shown) has been expanded onto the rigid tube and the expansion means 3 is withdrawn through the rigid tube 4 the expansion means is in the second state. In the second state the outer diameter of the expansion element 5 is smaller than the inner diameter of the rigid tube 4 due to the radially resilient expansion element 5. At the withdrawal of the expansion means 3 the handle 6 and the expansion means 3 is no longer in contact through the first contact surface 21 as pulling the handle 6 will change the relation between the handle and the expansion element in axial direction and they will be in contact through a second contact surface 22. The second contact surface 22 gives axial support between the handle 6 and the expansion element 5 and transfer the pulling force between the handle 6 and the expansion element 5 at the withdrawal of the expansion means 3.

Figure 6:
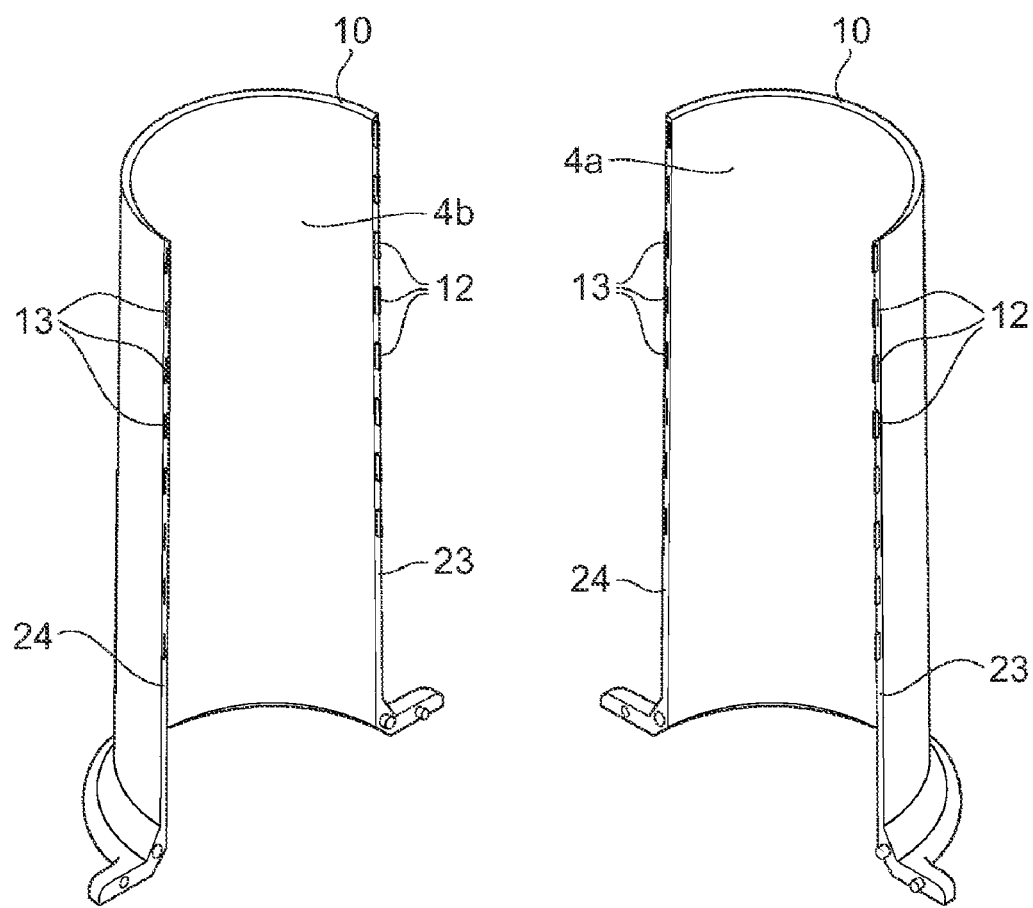

FIG. 6 is an embodiment of the rigid tube 4 according to one embodiment of the invention. The rigid tube 4 comprises two semi-cylindrical parts 4a,4b, wherein each part comprises a first parting surface 23 comprising a plurality of protrusions 12 and a second parting surface 24 comprising a plurality of corresponding recesses 13 for receiving the fingers when the two parts 4a, 4b are assembled to the rigid tube 4.

According to an alternative to the embodiment shown in FIG. 6 the two semi-cylindrical parts 4a, 4b are connected at one parting line 18 with a hinge (not shown).

According to a further alternative to the embodiment shown in FIG. 6, one oblong recess (not shown) is arranged along the second parting surface 24 and a corresponding oblong protrusion (not shown) is arranged along the first parting surface 23 to form the rigid tube 4.

The diameter of the rigid tube 4 in FIG. 6 is slightly conical, for example, in the order of 1°, to facilitate the removal of the rigid tube from the elastic body 2.

The device 1 is made of a suitable polymer, for example, polypropylene or polyamide.

The invention is not in any way limited to the preferred embodiments described above. On the contrary, several possibilities to modifications thereof should be evident to a person skilled in the art, without deviating from the basic idea of the invention as defined in the appended claims. For example the rigid tube could be axially divided into three or more parts. Further different parts of the device could be made of different types of polymers.

What is claimed is:

1. A device for expanding a tubular elastic body, the device comprises a rigid tube to be introduced into at least a part of the elastic body and keep the elastic body in an expanded state, and an expansion means adapted to expand the elastic body and arranged to be introduced into a first end of the rigid tube, wherein one end of the expansion means is provided with an expansion element with a width decreasing in the introduction direction of the expansion means at introduction into the first end of the rigid tube, the expansion means is adapted to be movable inside the rigid tube and when the expansion means is fully introduced in the rigid tube, the expansion means protrudes at a second end of the rigid tube and thereby forms a transition between the rigid tube and the expansion element, characterized in that the expansion element is radially resilient between a first and second state over at least part of the expansion elements length, and the outer diameter of the expansion element at the transition is essentially the same as, or larger than, the outer diameter of the rigid tube at the transition when the expansion means is in the first state, and the outer diameter of the expansion element is smaller than the inner diameter of the rigid tube when the expansion means is in the second state, wherein the expansion means comprises a handle to which the expansion element is aligned in an axial direction and attached in a loose connection, the handle is adapted to cooperate with the expansion element during introduction and withdrawal of the expansion means through the rigid tube, wherein the expansion means has a play in axial direction at the loose connection between the expansion element and the handle facilitating moving the expansion means from the first state to the second state and wherein the loose connection comprises a first and a second contact surface.

2. The device according to claim 1, wherein the expansion element is at least partly conical.

3. The device according to claim 1, wherein the expansion means comprises a handle to which the expansion element is aligned in an axial direction and attached in a loose connection, the handle is adapted to cooperate with the expansion element during introduction and withdrawal of the expansion means through the rigid tube.

4. The device according to claim 3, wherein the handle has the shape of a tube with an outer diameter being close to the inner diameter of the rigid tube.

5. The device according to claim 1, wherein the handle comprises a support adapted to be in contact with the first end of the rigid tube during introduction of the expansion means and rigid tube into the expandable body.

6. The device according to claim 1, wherein the expansion element is slit with a plurality of slits from the end facing the transition.

7. The device according to claim 1, wherein at the first state the expansion element is arranged to be axially supported by the handle at the first contact surface, such that at least part of the force necessary for introducing the device into the elastic body is transferred between the handle and expansion element through the first contact surface.

8. The device according to claim 1, wherein at the second state the expansion element is arranged to be axially supported by the handle at the second contact surface, such that at least part of the pulling force necessary for removing the expansion means out of the elastic body and rigid tube is transferred between the handle and expansion element through the second contact surface.

9. The device according to claim 1, wherein the end of the expansion element facing the transition has a first bevel cut edge with an angle corresponding to an angle of a second bevel cut edge at the front end of the expansion means.

10. The device according to claim 9, wherein the end of the expansion element facing the transition comprises a rounded edge, such that a smooth transition is formed between the first beveled cut edge and the outer surface of the expansion element.

11. The device according to claim 1, wherein the rigid tube comprises at least two semi-cylindrical parts configured to be put together to the shape of the rigid tube.

12. The device according to claim 11, wherein each semi-cylindrical part comprises a first parting surface comprising at least one protrusion and a second parting surface comprising at least one corresponding recess for receiving the at least one protrusion when the two parts are assembled to the rigid tube.

13. The device according to claim 11, wherein the at least two semi-cylindrical parts are connected at one parting surface with a hinge.

14. The device according to claim 1, wherein the device comprises one of the following polymers: polypropylene or polyamide.

15. The device according to claim 1, wherein the tubular elastic body comprises one of the following: a jointing body, a stress cone, a termination, a shielding or sealing sleeve, or an adapter.

* * * * *